United States Patent [19]

Chantry et al.

[11] Patent Number: 5,223,187

[45] Date of Patent: * Jun. 29, 1993

[54] PROCESS OF MAKING POLYESTER MONOFILAMENTS FOR REINFORCING TIRES

[75] Inventors: William A. Chantry, Kinston; Amy G. Roberson, Winterville, both of N.C.; Taracad K. Venkatachalam, Wilmington, Del.

[73] Assignee: E. I. Du Pont de Nemours and Company, Wilmington, Del.

[*] Notice: The portion of the term of this patent subsequent to Jan. 21, 2009 has been disclaimed.

[21] Appl. No.: 721,811

[22] Filed: Jun. 26, 1991

Related U.S. Application Data

[62] Division of Ser. No. 538,294, Jun. 14, 1990.

[51] Int. Cl.$^5$ .............. B29C 35/10; D01D 5/16; D01F 6/62; D02J 1/22

[52] U.S. Cl. .................. 264/25; 264/178 F; 264/210.7; 264/210.8; 264/211.15; 264/211.17; 264/235.6

[58] Field of Search .............. 264/178 F, 210.7, 210.8, 264/211.14, 211.15, 211.17, 25, 235.6

[56] References Cited

U.S. PATENT DOCUMENTS

| | | | |
|---|---|---|---|
| 3,963,678 | 6/1976 | Conrad | 264/178 F |
| 4,098,864 | 7/1978 | Morris | 264/DIG. 28 |
| 4,451,422 | 5/1984 | Yui et al. | 264/210.8 X |
| 4,504,432 | 3/1985 | Kamei et al. | 264/210.8 X |
| 5,082,611 | 1/1992 | Adams et al. | 264/210.8 X |

FOREIGN PATENT DOCUMENTS

| | | | |
|---|---|---|---|
| 50-16448 | 6/1975 | Japan | 264/178 F |
| 1167696 | 10/1969 | United Kingdom . | |

OTHER PUBLICATIONS

W. W. Doll "The Production of Polyester Monofilament for High-Technology Applications", presented Apr. 24, 1990 at Fiber Producers Conference.

*Primary Examiner*—Leo B. Tentoni

[57] ABSTRACT

Polyester of high intrinsic viscosity is spun, steam-heated, drawn and wound up in a multi-stage continuous process to provide an improved monofilament that is particularly suited for reinforcing rubber, e.g. in tires, after suitable dip-coating, stretching and setting.

15 Claims, 2 Drawing Sheets

FIG.1

PROCESS OF MAKING POLYESTER MONOFILAMENTS FOR REINFORCING TIRES

This is a division of application Ser. No. 07/538,294, filed Jun. 14, 1990.

TECHNICAL FIELD

This invention concerns improvements in and relating to high viscosity polyester monofilaments, and more particularly to improvements in processing of a monofilament of polyester of high viscosity, to the resulting monofilaments, and to dipped cords thereof, and tires and other articles incorporating such monofilaments, and particularly such articles reinforced with such monofilaments.

BACKGROUND OF THE INVENTION

Polyester filaments have been commercially available for several decades, and are widely preferred for many apparel and industrial end uses. Practically all of this commercial production has been of poly(ethylene terephthalate) filaments, sometimes referred to as 2G-T, although other ethylene terephthalate polymers have been suggested and some have been made and used commercially.

For many existing high strength uses, sometimes referred to as industrial or technical to distinguish from uses in normal apparel, the polymer has been of high relative viscosity. Such viscosity is measured herein as LRV. Such high LRVs have been about 25 or more; this has also been referred to as a high intrinsic viscosity in a range of about 0.7 to 1.2.

Most commercial production of polyester filaments has been generally of multifilaments, i.e. continuous multifilamentary yarns or spun yarns (spun for instance on the cotton system, from cut staple). These have been of relatively low dpf (denier per filament), generally in a range of about 1 to 6 dpf. This has been so even for industrial end uses, such as reinforcing tires, when high strength has been required. In contrast to multifilaments of low dpf, a small amount of higher dpf filaments have been prepared and used as single filaments (monofilaments), e.g. for bristles and for weaving into screens for papermaking machines and other specialized uses. These, however, are believed to have been made from polyester of regular viscosity, in practice.

When high viscosity polyester multifilamentary industrial yarns have been used to reinforce rubber in tires, for example, they have been twisted and plied into cords. The actual strength contributed by the reinforcing cords in the final rubber articles has been considerably reduced from the higher values measured on the earlier individual low denier filaments and yarns. In other words, measurement of such properties on such earlier low denier filaments and yarns can give a misleading impression of how much reinforcement will later be provided by the cord in a tire, especially after heat treatments that are conventional during tire manufacture. All this has long been well known.

So, it has long been desired by some researchers to make satisfactory polyester filaments of high strength of much higher denier, e.g. of one thousand to several thousand denier (i.e. a dtex of the order of about 1000 to about 10,000 or more dtex on the metric system). These higher deniers are generally intended to be sufficiently high that the single filaments are usable for rubber reinforcement as such, instead of lower denier multifilaments that need to be twisted or otherwise combined into yarns & cords. So these higher denier filaments are referred to as monofilaments, in contrast with multifilaments. It has been particularly desirable to make reinforcing monofilaments from polyester of high viscosity, for use in tires, and for other reinforced articles. In practice, so far, previous efforts have not succeeded in providing commercially acceptable reinforcing monofilaments of high viscosity polyester and/or processes for their production, let alone tires reinforced with such monofilaments.

For instance, Conrad et al disclosed polyester monofilaments in U.S. Pat. No. 3,963,678, using a relatively slow process (less than 200 ypm) that was desirably kept slow to obtain the desired birefringence profile, while Morris et al in U.S. Pat. No. 4,098,864 disclosed another relatively slow steaming process that required sufficient residence time for the steam to be effective.

An important object of this invention is to provide a process for making high viscosity polyester monofilaments that is more viable commercially, and several novel process aspects are provided herein, together with product aspects of the present invention, including the resulting new monofilaments, and the tires and other articles that are the ultimate objective of the invention, as well as "dipped cords" that are intermediate products for making tires. The properties of dipped cords of multifilament yarns have generally been used as a guide to performance in tires. So far as the properties of the products are concerned, their ultimate performance in tires is of great importance, and knot tenacity has been a defect in prior products, in this regard.

SUMMARY OF THE INVENTION

In accordance with the present invention, there are provided tires reinforced with high viscosity polyester monofilaments, polyester monofilaments that display an exceptional combination of tensile properties, dimensional stability and performance when processed to make tires, e.g. in the form of "dipped cords" thereof, and improvements in a continuous process that includes the steps of melt-spinning, air-gap water-quenching, drawing and winding up the drawn monofilament. In such process, the heavy denier monofilament is drawn, after quenching, in at least first and second draw stages, generally to a total draw ratio of at least 5.5×. The quenched filament is advanced in the first draw stage through a steamer, supplied with high temperature steam under superatmospheric pressure, and is advanced in a further draw stage as it is heated with non-contact dry heat. Such a process so far is similar to what has been disclosed by Morris. So, important differences from Morris are highlighted herein. For instance, Morris limited his first stage steam draw ratio to a maximum of 4.0×, and emphasized the advantages of so limiting this, and the problems of exceeding 4.0×.

In contrast, according to one process aspect of the invention, our process is characterized by drawing the monofilament in such first stage in a steam zone at a draw ratio of at least about 4.5×. This is an important difference. A lower draw ratio in this first (steam-treating) drawing step leads to lower tenacities than are desired according to the invention.

The steam treatment is preferably effected by passing the undrawn monofilament into a zone that contains saturated steam under high pressure, such as at least 120 psig (corresponding to about 925 kPa, and a condensation temperature of about 176° C.), preferably at least 150 psig (corresponding to about 1130 kPa, and a condensation temperature of 186° C.), so the monofilament is heated by steam condensing at correspondingly high condensation temperatures. Morris used his steam pressure as a way to direct jets of steam against the monofilament at significant steam impingement velocities. We have not directed steam jets to impact on our undrawn filaments. We have passed our monofilaments into an atmosphere or zone of superatmospheric steam.

According to another process aspect of the invention, our first stage draw rolls are preferably heated to a temperature of at least about 140° C., especially to at least about 180° C. Morris did not heat such draw rolls. This heating is believed important to achieve a high draw ratio, and correspondingly high tenacity, in the further drawing.

According to another process aspect of the invention, our further drawing stage is performed in more than one step, and a large proportion of our further drawing is preferably performed in the first such step (i.e. of the further drawing multi-step operation). If the further drawing is carried out in only 2 steps, e.g. 2 passes through a heated draw zone, more than 50% of the further drawing is preferably carried out in the first of these 2 steps. If, however, more than 2 steps are performed in the further drawing stage, at least 40% of such further drawing is preferably performed in the first such step. Also, the final step of this stage is preferably essentially an annealing step (still under a high tension), rather than a drawing step, i.e. little further drawing is accomplished, preferably less than about 10% of such further drawing, in the last step of this stage. In such further drawing, a non-contact heater, such as a radiant heater is preferred. In this stage the monofilament is subjected to a very high temperature, preferably at least 600° C., especially in the range 700°-900° C., while under high tension, in order to raise its tenacity and lower its shrinkage. Conveniently, as shown later, this multi-step drawing stage may be performed in several passes through the same heater. This further drawing is different in several respects from Morris.

According to a further process aspect, our drawn monofilament is preferably annealed on heated annealing rolls before being wound up, in order to reduce its shrinkage. Morris did not use such heated rolls. Such annealing rolls should desirably be heated to a temperature of about 100° to 250° C. to achieve this shrinkage reduction, and preferably at least about 140° C., and up to about 200° C., especially in a range of about 160°-180° C.

According to a further process aspect, our drawn monofilament is preferably wound up at a relatively low winding tension, e.g. in the range of about 100-200 grams, such as may be achieved by using an appropriate type of constant tension winder, e.g., a spindle driven, constant tension winder, at an appropriately lower speed to provide let down between the annealing rolls and the windup. This is not suggested by Morris.

According to another aspect of the invention, there is provided a monofilament of ethylene terephthalate polymer having a high intrinsic viscosity in the range of about 0.7 to 1.2, said monofilament having a denier of at least about 1000, a tenacity of least about 5.5 gpd, preferably at least about 7 gpd, an elongation (i.e. elongation to break) of at least about 15%, a modulus of at least about 80 gpd, and a dry-heat shrinkage at 177° C. (DHS) of about 3.5% or less, and preferably even lower, less than about 3%, or about 2.5% or less. It is preferred that the monofilaments have a knot tenacity of at least about 4 gpd. It is also important that the monofilaments should adhere well to rubber, as shown by an adhesion of at least 50 lbs, preferably of the order of 60-65 lbs or more.

Preferably such monofilament is of oblong cross-section, with a width-to-thickness ratio greater than about 2.0, and a modification ratio greater than about 2.0. Preferably either or both of such ratios should be greater than about 3.0, particularly when preparing monofilaments of higher denier within the aforesaid range.

Such monofilaments are particularly useful as reinforcement, especially for rubber articles, such as tires. For use as tire reinforcement, as indicated already herein, several multifilamentary yarns have been assembled together and formed into cords (that are of much higher denier than the yarns). These cords are generally given a pre-adhesive coating and a rubber adhesive coating and hot stretched and set, and are commonly referred to in this state as a dipped cord. Monofilaments according to the invention need not be twisted and assembled together to be formed into higher denier cords, since they may be prepared at the denier corresponding to what will be required for the eventual reinforcement. This provides significant processing and product advantages for monofilaments over multifilament yarns, which latter generally have to be made of lower denier than required for the cords that are used to reinforce rubber. Monofilaments, however, may be processed similarly in other respects by appropriate coating, hot stretching and setting, so this term "dipped cords" is used herein for such coated, hot stretched, set monofilaments that are ready for use in reinforcing rubber.

Such monofilament cords are provided, according to another aspect of the invention, showing an outstanding balance of properties, including a combination of high modulus and low shrinkage that is sometimes referred to as dimensional stability, but also with good knot tenacity, good adhesion and good flex properties. Preferred new cords are characterized by a tenacity of at least about 6 gpd, an elongation of at least about 10%, and preferably of the order of 15% (i.e. 14-16%) or more, an initial modulus of at least about 100 gpd, a knot tenacity of at least about 3 gpd, and a dry heat shrinkage at 177° C. (DHS) of less than about 4.5%, preferably less than about 2%, a suitable pre-adhesive coating, as a subcoat, especially of PAPI-epoxy (a subcoat that is a mixture of polyaromatic polyisocyanate with an epoxy polymer), having been applied, and a suitable topcoat, especially a mixture of resorcinol, formaldehyde and latex, or other suitable rubber adhesive, generally in amount about 0.5 to 10%, by weight, it being understood that the tensile properties, however, refer to a dip-free denier.

The monofilaments of this invention are useful in pneumatic radial tires, particularly passenger and truck tires. Such tires are normally inflated to at least about 20 psi, and usually to much higher pressures. Testing of radial tires at even lower pressures indicates that the monofilaments still have adequate durability down to about 10 psi.

According to another aspect of the invention, there are provided pneumatic radial tires, e.g. for passenger cars or light trucks, comprising at least one pair of bead portions and at least one carcass ply wrapped around said bead portions, wherein each carcass ply comprises a rubberized layer of load-bearing ethylene terephthalate polymer monofilaments, preferably of oblong shape, wherein said monofilament is characterized by a denier of at least about 1000, especially about 2000-10,000, and a tenacity of at least about 6 gpd, preferably about 7.5 gpd or more, with an elongation of at least about 10%, an initial modulus of at least about 100 gpd, and a knot tenacity of at least about 3 gpd. Such monofilaments are preferably not twisted, or substantially untwisted. An advantage of such tires is their low inflation growth, a measure of dimensional stability, preferably less than about 1%.

While the monofilaments of this invention have been shown to be useful in reinforcing cords for tires, they are also expected to be useful in a variety of other rubber applications such as V-belts, hoses, and conveyor belts. They are also expected to be useful in non-rubber applications such as ropes, cables, paper-machine clothing screens, filtration fabrics, and other uses that have been suggested for monofilaments of polyester.

DETAILED DESCRIPTION OF THE INVENTION

A preferred process according to the invention is described with reference to FIG. 1, using poly(ethylene terephthalate) polymer of high viscosity in a continuous process of melt-spinning and drawing to provide an oblong monofilament. Although spinning of a single monofilament is described, it will be understood that the technique can be modified to provide for processing more than one.

Such monofilament 11 is melt-spun from an appropriate orifice in a spinneret, indicated generally as 10, through an air gap 12, into a water bath 13, that quenches the hot monofilament, and is pulled out of water bath 13 by puller rolls 15 past a stripper 14, such as an air jet, to remove excess water from quenched monofilament 11, and forwarded to feed roll assembly 16. For convenience, the length (and duration) of passage through water bath 13 may be adjusted and controlled by providing a curved surface 13A, such as a curved plate, round which the monofilament 11 changes direction, with means (not shown) for varying the location of surface 13A. Puller rolls 15 are driven, and control the tension on the monofilament 11 as it passes through air gap 12 and through water bath 13, from spinneret 10. Feed roll 16 is the beginning of the drawing operation, described hereinafter, and so preferably is also driven, separately, to control precisely the draw ratio during the first stage draw.

The monofilament is advanced through the first draw stage, involving steam heating in steamer 18, by draw rolls 21, that are driven, and advance the monofilament at a speed that is higher than that of feed rolls 16, the ratio of such speeds being the first stage draw ratio. It is desirable to use a high first stage draw ratio in order to raise the tenacity of the eventual drawn monofilament. This is an important difference from Morris. Our use of such a high first stage draw ratio, more than about 4.5×, is facilitated by various techniques described herein, including pre-heating the monofilament by an optional non-contact preheater 17, before the monofilament enters the steamer, indicated generally as 18, and using steam at high pressures to provide correspondingly high condensation temperatures. Draw rolls 21 are also preferably heated, for instance, in an insulated draw box maintained at the desired temperature. If desired, after steamer 18, the monofilament may be passed by another air stripper 19 to remove surface water. The draw rolls 21 perform as feed rolls for the second stage draw.

The second stage draw is preferably performed at a higher temperature (than the steam drawing in the first stage). This is conveniently effected by using a non-contact heater 22 (referred to in Table 1 as oven 22), such as a radiant heater at a much higher temperature, and by advancing the monofilament through such heater 22 more than once (several passes), at increasing speeds, by driven rolls, that are referred to generally as 23. Three such rolls are shown specifically as 23A, 23B and 23C, located outside heater 22, as shown, and are driven at increasing speeds to provide step-wise further drawing, and finally annealing rolls 24. The ratio of the speed of annealing rolls 24 to the speed of draw rolls 21 is the draw ratio in the further drawing stage. From the ratios of the speeds of successive rolls 23 to each other and to the speeds of preceding draw rolls 21 and of following annealing rolls 24, can be calculated the draw ratios in the various steps of this multi-step further draw stage. It should be understood that the number of passes through heater 22 may be varied, as desired, using for instance an appropriate number of rolls 23 to achieve this.

The drawn monofilament then passes from annealing rolls 24 to wind up 25, that is driven preferably at a constant tension that is relatively low, so as to provide let down from the annealing rolls.

The particular polyester used in the Examples was poly(ethylene terephthalate), but other ethylene terephthalate polymers may be used, if desired. Typically monofilaments of intrinsic viscosity greater than 0.7 are prepared, to provide the high strength and highly durable filaments that are desired for tires, and such like reinforcing purposes. The optimum viscosity will be selected according to need and the results obtained. Heretofore, better strength as been obtained as the viscosity has been increased, but raising the viscosity has increased the cost and, often, the processing difficulty, e.g., in spinning. For dimensional stability in the sense of low shrinkage, a viscosity of about 0.85-0.95 may be preferred, as will be seen, hereinafter. A suitable temperature for the melt is generally 285°-310° C.

The quench water bath is preferably at a temperature in the range 35°-90° C., especially in a range from 50° to 80° C. Suitable air gaps have been from 15 to 35 inches (about 35 to 90 cm). Tension in the air gap and quench bath is generally minimized by adjusting the air gap distance in order to minimize the development of positive birefringence and orientation in the monofilament surface before the monofilament is oriented (by stretching). However, the tension should be sufficient to provide stability to the threadline in the quench bath. Preferably, the temperature of the quenched filament is controlled by adjusting the residence time of the monofilament in the quench bath such as by increasing or decreasing the path of travel within the quench bath. This may be accomplished by providing a change of direction surface within the quench bath which can be moved, when the process is running, to different depths below the surface of the quench bath, to increase or decrease the path of travel in the bath and thus increase or decrease the residence time within the bath. Compensation for variations in the quality of the polymer which would affect the draw point can thereby be provided. In addition, it is also advantageous to select and/or control the temperature of the quench bath to adjust the temperature of the quenched filament. In the most preferred form of the invention, the quench water temperature is controlled to within 1.0° C. and the length of the submerged path of the filament in the quench water is controlled to within 2 inches (about 5 cm) when the process is operating under steady state conditions. This provides convenient process control.

After leaving the quench bath, excess water on the filament is generally removed by a stripper. Most of the water is vacuumed off at this time. In some of the Examples, water was added after feed rolls 16, but we found such added water was not necessary, and no significant difference was noted when such water was not added.

A suitable preheater 17 is a 24 inch (about 60 cm) radiant heater, which may operate within a temperature range of about 400°-900° C. This heater is preferred, generally, so as to provide enough heating of the yarn to allow for more first stage draw. This can be important, as it can provide a way to increase the tenacity of the drawn monofilament.

The first stage draw conditions are selected such that the heat from the steam assists in drawing, which is believed to help to orient the core and, additionally, substantially deorient and further hydrate the surface of the monofilament to prevent the development of molecular orientation or birefringence in the surface as the filament is stretched. Further the steam is believed to roughen and make porous the surface of the filament, allowing for better adhesion in rubber. This improvement in porosity may be shown by comparing dye uptakes; the surface of a suitably steamed monofilament shows ready dye uptake in contrast to only very minor dye penetration of the surface of an unsteamed monofilament. A suitable steam atmosphere for 2G-T is typically saturated steam at high pressures, such as 100-165 psig (corresponding to about 800-1250 kPa, and condensation temperatures of about 170° -190° C.). In contrast, Morris made jets of steam impinge on the surface of the monofilament. Impingement by such jets is not considered as desirable as using an atmosphere of steam. The first stage draw point is preferably maintained at a location before the monofilament leaves the high temperature steam heating zone of the heater.

After exiting from the steamer, the monofilament may be passed through an air stripper 19. We have not so far noted any advantage from using such an air stripper. The monofilament is then contacted by first stage draw rolls 21 The amount of draw in the first draw stage is determined by the speed of first stage draw rolls in relation to the feed rolls. The rolls are preferably heated to a temperature of 140°-240° C., especially in a range of about 180°-210° C.

From the first stage draw rolls, the monofilament advances into a radiant heater employed in the second stage draw. For polyester, a suitable temperature in the heater of 600 to 1000° C. with an exposure time such that the filament surface temperature remains at least 10° C. below the melting point of the filament is preferably employed.

In the present process, the second stage draw, referred to as further drawing, is performed such that the draw of the monofilament progresses as the core temperature of the filament increases. The preferred apparatus for this further drawing is four passes through the heating zone in the heater by conveying the filament through the radiant heater by means of controlled speed change of direction rolls 23, which contact the monofilament before and after each pass through the heater. The speeds of the change-of-direction rolls are controlled so that the tension on the monofilament decreases or remains the same as the monofilament advances past each of these change-of-direction rolls. The overall draw in the further stage of drawing is determined by the ratio of the speed of the final pair of rolls 24, referred to as annealing rolls, in relation to the first stage draw rolls 21. However, the amount of draw in each of the passes through the heater within this further stage of draw is determined by the speed of the rolls defining that particular pass. Drawing in several gradual steps takes place during each of the passes. The surface temperature in this further stage of draw should desirably cause the monofilament surface to lose most of its orientation and just attenuate during this further stage of draw. This is desirable to achieve a substantially unoriented skin on the monofilament which is believed to give good knot strength, adhesion to rubber and flex fatigue resistance. The temperature at which this attenuation versus drawing occurs is believed to be determined partially by the amount of hydration of the surface polymer that occurs in the first stage steamer. For 2G-T polyester, a surface temperature of about 240° C. is believed adequate to cause the desired low surface orientation. The further stage of draw is believed to provide versatility to produce a wide variety of differing monofilament deniers at different process speeds with the same process equipment while providing an optimum draw profile for the product. An annealing roll temperature, ranging from 100°-250° C., provides a useful method to control shrinkage and work-to-break of the monofilament.

With regard to preferred temperatures, generally, it should be understood that a monofilament is a relatively large body of solid polymer, so it requires much more time for heat to penetrate than for filaments of low dpf that have been processed conventionally. The denier, and importantly the cross-sectional dimensions of the monofilament, and the speed with which it is advanced, will all have an important bearing on the energy that should be provided so that the interior of the monofilament can be heated properly, when this is the objective. Thus, as the speed is raised, it becomes important to provide a high enough temperature and sufficient duration (e.g. enough passes) to effect adequate heat penetration. Similarly, as the thickness of the monofilament is increased, and the heat capacity more generally is increased, care should be taken to achieve the desired extent of heating within the body of the monofilament.

Caution is required to avoid twist when stringing up, as vacuum string up guns do have a tendency to insert twist. With too much twist between the rolls, particularly in the radiant heater passes, the monofilament will tend to move back and forth, and may even jump off the turning rolls, such as 23, or may contact hot surfaces and break. A string up gun is preferably held in such manner as to maintain tension at the tip of the gun so that the torque is contained within the gun and the monofilament outside is straight (untwisted). When a small amount of twist is seen, a ceramic "U" guide can be used to move such twist into the gun.

The process provides superior results to those disclosed by Conrad or Morris, and also produces monofilaments at higher speeds and throughputs. In a preferred process of the present invention, monofilaments are spun at a polymer throughput rate of greater than 35 lbs. per hour per filament.

By employing the process of the invention, monofilaments of the invention can be produced which have a tenacity greater than 5.5 gpd, with a modulus above 80 g/d, and knot strength at least about 4 gpd. In addition, these properties can be achieved when the process of the invention is used to produce 1000–5000 denier monofilaments at a throughput rate of greater than 35 lb./hr. and at process speeds of 500 ypm or more, e.g. of the order of 500 mpm. The monofilament is preferably made in an oblong cross section, with a width-to-thickness ratio greater than about 2. By "oblong", it is intended to refer to any of a variety of elongated cross-sectional shapes which are circumscribed by a rectangle with its width (major dimension) greater than its thickness (minor dimension), as disclosed by Henning in copending application Ser. No. 07/288,750 filed Dec. 22, 1988.

Preferably, for a monofilament in accordance with the invention, the cross section is oblong having generally rectangular cross-section with rounded corners or semicircular ends and thus is produced by spinning through an oblong or rectangular spinneret. Depending on the viscosity of polymer as extruded, the resulting monofilament has a cross section which may vary somewhat from the cross section of the spinneret and may assume some oval character and the "flat areas" may be somewhat convex. As used herein for cross sections of monofilaments, oblong is intended to refer to oblong cross-sections or those which approximate oblong cross sections. In the preferred monofilaments having an oblong cross section, the width to thickness ratio of the monofilaments, i.e., the width of the circumscribing rectangle divided by the thickness, is greater than about 2.0. While the advantages of the invention are realized increasingly with increasing width-to-thickness ratio above about 2.0, a practical upper limit for the monofilaments is ultimately reached for in-rubber applications when the spacing needed between adjacent cords becomes so large at a rivet area of, for example, 35%, that there is insufficient support for the rubber between cords and rubber failure occurs. Also, as the width-to-thickness ratio becomes very large (film-like filament) high shear and bending stresses will ultimately cause filament buckling and splitting. Thus it is generally preferable for the width-to-thickness ratio of monofilaments of the invention not to exceed 10. The preferred monofilaments of the invention have a width in mm greater than about 0.5 mm. Monofilaments of the invention with greater than these widths can be manufactured at high productivity and also reduce the end count in fabrics thereby lowering cost in use. High manufacturing productivity results from increasing product denier via making wider filaments without increasing thickness. Surprisingly, the speed at which preferred monofilaments of this invention can be spun, quenched and drawn is believed to depend only on their thickness. Hence, wider filaments are believed capable to produce more pounds/hour/threadline than narrow filaments of the same thickness. It has been discovered that monofilaments which best combine the advantages of high productivity and high value to the customers in rubberized fabrics have widths in mm greater than about 0.5 mm.

The denier of the monofilaments in accordance with the invention is about 1,000 and can be as great as 10,000 or more. Monofilaments having a denier of greater than 2,000 are preferred.

Monofilaments produced in the process have a roughened, porous surface that is produced by the drawing action taking place in the steam chamber. Due to the porous surface of the monofilament which provides good adhesion to rubber, the monofilaments are believed to be ideally suited for in-rubber uses.

The combined steaming in the first stage and radiant heating in the second stage, also provides a high work-to-break which results in improved fatigue resistance and higher plunger energy or burst strength in tires.

TEST METHODS

For the present invention, the various parameters and measurements were generally (unless indicated otherwise) as in copending Applications Ser. Nos. 07/288,750 (RD-4940), filed by Henning Dec. 22, 1988, and 07/288,519 (RD-4941 filed by Henning et al Dec. 22, 1988, and in Gupta U.S. Pat. No. 4,850,412, which are hereby specifically incorporated herein by reference. The monofilaments were conditioned and tested in a room with 65% RH at 72° F. (22° C.) as is advisable for consistent and comparable measurements. The dipped cords and tires were tested at 75° F. (24° C.) and 55%RH.

Width to Thickness Ratio (W/T): Width and thickness are measured with a Vernier caliper. For width measurement, it is convenient to fold the monofilament into a "V" and measure both sides of the "V" at the same time, being sure to keep the Vertex of the "V" just outside the measured zone. This technique helps to assure that the monofilament does not tilt between the faces of the measuring instrument and give a low reading.

Modification Ratio: Modification Ratio (MR) is measured from a photomicrograph of a monofilament cross-section taken perpendicular to the filament axis. Using a compass, the smallest circle that can be circumscribed about the cross section and the largest circle that can be inscribed within the cross section are determined, and the diameters of these two circles measured. Modification Ratio=diameter of the circumscribed circle/diameter of the inscribed circle. For relatively simple cross sections such as those illustrated by Henning in application Ser. No. 07/288,750, it is evident that modification ratios and width-to-thickness ratios are equivalent. For more complex cross-sections, the two ratios can be quite different.

Tensile Properties: A recording Instron unit is used to characterize the stress/strain behavior of the monofilament. Samples are gripped in air-activated Type 4-D Instron clamps maintained at least 40 psi pressure. Samples are elongated to break while continuously recording monofilament stress as a function of strain. Initial gauge length is 10 inches (about 25 cm), and cross head speed is maintained at a constant 12 inches/minute (about 30 cm/min). The tensile properties for dipped cords are always based on dip-free deniers.

Break strength is the maximum load achieved prior to rupture of the sample and is expressed in pounds or kilograms.

Tenacity is calculated from the break strength divided by the denier (after correcting for any adhesive on the filament) and is expressed as grams per denier (gpd).

Elongation is the strain in the sample when it ruptures, expressed as a percentage.

Modulus is the slope of the tangent line to the initial straight line portion of the stress/strain curve, multiplied by 100 and divided by the (dip-free) denier. The modulus is generally recorded at less than 2% strain.

The knot tensiles (e.g. Knot Tenacity) are measured in the same manner as straight tensiles except that a simple overhand knot is tied in the monofilament at about the midpoint of the sample to be tested. The simple overhand knot is made by crossing a length of the monofilament on itself at about the midpoint of its length and pulling one end through the loop so formed. Since the monofilament tends to assume some of the curvature of the wind-up package, the knot is tied with and against this curvature on separate samples and the two samples averaged.

Dry Heat Shrinkage (DHS) is determined by the basic method of ASTM D-885-85, Section 30.3 as described in: "1988 Annual Book of ASTM Standards; Vol. 07.01; Textiles, Yarns, Fabrics and General Test Methods." Specifically, the yarns were heated at 177° C. in hot air for two minutes at 0.05 gm. per denier restraining force. The test device was a "Testrite Thermal Shrinkage Oven". Shrinkages are expressed as percentages of the original length.

Relative Viscosity (LRV) is a sensitive and precise measurement indicative of polymer molecular weight. LRV is the ratio of the viscosity of a solution of 0.8 grams of polymer dissolved at room temperature in 10 ml of hexafluoroisopropanol containing 100 ppm sulfuric acid to the viscosity of the sulfuric acid containing hexafluoroisopropanol itself, both measured at 25° C. in a capillary viscometer. The use of hexafluoroisopropanol as a solvent is important in that it allows dissolution at the specified temperature and thereby avoids the polymer degradation normally encountered when polyesters are dissolved at elevated temperatures. LRV values of 38 and 44 correspond roughly to intrinsic viscosity values of 0.90 and 0.95, respectively, when the intrinsic viscosity is measured at 25° C. in a solvent composed of a mixture of trifluoroacetic acid and methylene chloride (25/75 by volume).

Denier—A ninety centimeter sample of the monofilament is weighed. Denier is calculated as the weight of a 9000 meter sample in grams. For every sample tested, three denier measurements are made, and the average is used as the denier for the sample.

Adhesion (Hot, 2-Ply Strip Adhesion Test)

The test utilized was the same as ASTM Test D-4393-85; Strap Peel Adhesion of Reinforcing Cords or Fabrics to Rubber Compounds (pages 1133–1142; 1985 Annual Book of ASTM Standards, Section 7, Volume 7.01}with a few modifications. The particular variation used was to test individual monofilament tire cords that had been single-end dipped. The rubber stock employed was a combination of natural rubber (80 parts by weight), styrene-butadiene rubber (20 parts), N351 Black (35 parts), plus minor amounts of other conventional ingredients. The dipped tire cords were warped so that adjacent cords directly abutted each other. For example, 4,000 denier dipped cord required about 23 ends per inch. After embedment of the cords in the rubber stock, the sample was cured at 160° C. ±2° C. for 20 minutes at 1340 kPa pressure. Since hot adhesion was desired, the samples were heated in the Instron oven at 120° C.±2° C. for 25±5 minutes prior to testing. The separation force was based on Option 1 (the mid-line between the high and low peaks of separation force). Four samples per warp were tested and the results were reported as average force in pounds per inch.

Dip-Free Denier

To determine this, first the amount of adhesive on any cord is determined by (1) weighing an adhesive treated sample that has been cut into short (1 inch or less) sections; (2) the polymer portion of the cut sample is then carefully dissolved away in an appropriate solvent (e.g. trichloroacetic acid and methylene chloride mixture); (3) after rinsing and drying, the weight of the undissolved adhesive is measured and the % adhesive on the cord may be calculated. Then the denier of a dipped cord may be corrected to give the dip-free denier.

The dip-free deniers in Table 2, however, were determined by performing similar dipping and hot stretching operations as for the same dipped cords, but without any of the specified dips (adhesives) and, instead, substituting only water in place of the subcoat and topcoat adhesives, and then measuring and calculating the denier (in the usual manner).

Flex Fatigue: This is sometimes refered to as Flex Fatigue, and also as Scott Flex. It is measured by determining the percentage retained strength in test cords after cycling a 2-ply rubberized strip containing the test cord over a small pulley. 2-ply strips are prepared by wrapping a 9"×18" sheet of 0.015" 80:20 NR:SBR rubber on a building drum. Adhesive treated test cord is then wound onto the drum using a lathe to uniformly control cord spacing. End count is adjusted to provide 35% rivet area. A second layer of 0.015"rubber is then applied and the composite is stitched to remove entrapped air. The assembly is removed from the drum, cut into two 8"×9" pieces (cord parallel to the 9" direction), and placed on top of one another such that the cords in each ply are parallel to one another. A 2"×8" strip of cotton duck (provides gripping surface for clamps in fatigue tester) is applied across each end of the warp and a 0.030" (5"×8") sheet of rubber is used to fill in the area between the two cotton strips. These same materials are.. applied to the opposite side of the pad. The 2 ply pad is then cured in a platen press for 20 min at 160 deg C. under 7 tons pressure. The cured pad is cooled, conditioned 8 hours at 55% RH/75 deg F., and then cut into 1"×9" strips. The strips are then bent 180 degrees around a ¾ inch diameter pulley and clamped at each end in the Scott Flex tester (model Z) (manufactured by Scott Testers Inc., Providence, N.J.) and loaded at one end to 150 lb. The strip is then flexed over the pulley at a rate of 250 cycles per minute for a total of 10,000 cycles, while maintaining an ambient temperature of 100 deg C. The cords from the ply closest to the pulley are then removed from the pad (after soaking the pad for 24 hours in a 50/50 blend of Stoddard solvent and Freon 113) and the tensile strength is then measured on an Instron. The retained strength is compared with cord removed from an unflexed pad. Flex fatigue retained strength is determined from the equation: Retained Strength=100×(fatigued strength/unfatigued strength). So a high value shows that a high percentage of the original strength is retained after flexing in this test.

Table 3 reports various tests commonly made on tires.

Inflation Growth: Initial tire size is determined after mounting the tire on an appropriate rim and inflating the tire to 5 psi. After the tire is held at 5 psi for 4 hours at 100 deg F., circumference is measured (at the center of the tread) using a flexible steel tape measure). Care should be taken during the measurement to avoid any mold flashing. Cross section width is measured at the sidewalls at the widest part of the tire at 3 different positions (120 degrees apart - positions should be marked so that final measurements after growth can be made at the same spots) using a set of calipers. The tire is then inflated to 26 psi and held at that pressure for 24 hours at 100 degrees F. At the end of the 24 hour period, circumference and cross section width (CSW) are measured at the higher pressure. Tire inflation growth is calculated from the average growth in cross section width, and is listed as a percentage.

Cornering Coefficient: Cornering coefficient is measured on an apparatus also used for measuring rolling resistance, as described by R. L. Keefe and A. S. Koralek in their paper "Precision Measurement of Tire Rolling Resistance", ACS Rubber Division Symposium: Tire Rolling Resistance (October 1982), pp 78–104, D. J. Schuring, ed., 1983. Tires are first exercised for 90 minutes at 70 mph, 100% TRA (Tire and Rim Association) rated load. After cooling, the tires are conditioned 4 hours at 75 deg F., and 26 psi (P155/80R13 tires). The tire is then warmed for 5 minutes at 35 mph at the specified test load (838 lbs for P155/80R13). Lateral force is then recorded as a function of slip angle as the tire is steered from 0 to +3 degrees and from 0 to −3 degrees, changing the slip angle at a rate of 1¼ degree per second. The slope of the cornering force/slip angle plot (lbs/degree) is divided by the test load on the tire to obtain the cornering coefficient.

Sidewall Plunger Energy

The tire containing a suitable inner tube is mounted on a test rim and inflated to the applicable pressure specified for the tire size. The tire is then conditioned at 75° F.(±/1° F.) for 3 hours and the pressure readjusted to that specified prior to testing. Using a ¾ inch diameter cylindrical steel plunger with a hemispherical end, force the plunger perpendicularly into the sidewall at the rate of 2 inches/minute until the plunger passes through the carcass in the sidewall. Force and penetration are recorded at six points on the sidewall. The breaking energy in inch-pounds is then calculated by multiplying the force in pounds and the penetration in inches and dividing the product by 2. The Sidewall Plunger Energy data recorded is the average of the six values obtained.

Dot 109 Step Load Endurance Test and Extension Test

The test performed is the basic test described in Motor Vehicle Safety Standard No. 109, plus an extension to the test.

The tire is mounted on an appropriate test rim, inflated to the inflation pressure corresponding to the maximum load rating marked on the side of the tire, and conditioned for 3 hours at 100° F.. Pressure is checked and readjusted if necessary. In testing beyond DOT-109, the load is increased in 10% increments and the tire is run 400 miles at each load at 50 mph until failure.

Bead Area Endurance of Tires

This test is designed to induce flex type failures around the turn-up area (without thermal degradation interference) through high load applications.

The tire is mounted on an appropriate heavy-duty test rim and conditioned at 100° F. for 4 hours at 24 psi. The pressure is readjusted to the maximum psi allowed for the specified load range and then conditioned for another 4 hours.

The tire is then tested at 30 mph in the following sequence until failure: 90% load, 2 hours; 115% load, 2 hours; 150% load, 20 hours; 170% 20 hours; 190% load, 20 hours; and 210% load, until failure.

The invention is further illustrated in the Examples. Some approximate metric equivalents are given, it being recognized that measurements were made in conventional units as indicated in the text. Process conditions and monofilament properties for monofilaments according to the invention (numbered 1–4) and for Comparisons that are not according to the invention (denominated by letters A–C) are summarized later in Table 1. Comparisons A–C, for ease of comparison with Example 1, are located next to and before Example 1. Table 2 lists properties for "dipped cords" prepared from all the monofilaments, in the same order as for Table 1, and also for commercial HMLS 1000 denier T-240 tire yarns twisted in both a normal (NORM) and a low (LOW) twist construction, referred to hereinafter. Table 3 gives a comparison of results from testing tires, also described hereinafter.

EXAMPLE 1

Figure 1:
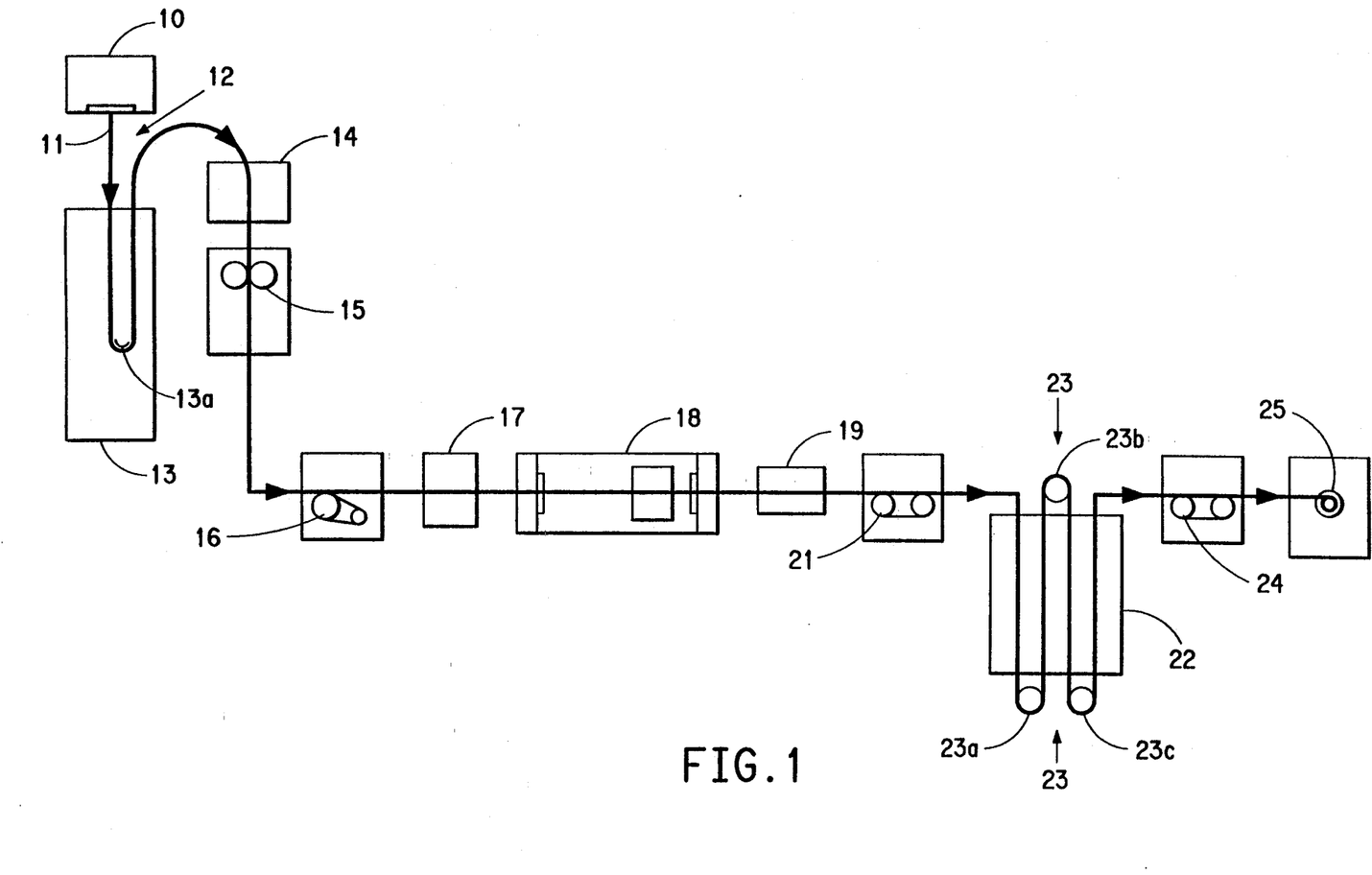
FIG. 1 is a schematic illustration of a preferred apparatus layout for performing the process of the invention.

This Example used an apparatus as illustrated in FIG. 1, without the optional preheater 17.

High quality poly(ethylene terephthalate) polymer, made in a continuous polymerizer having a relative viscosity (LRV) of 38, was extruded at a rate of 29 pounds per hour (indicated as "Thruput-Kg/h" in Table 1, i.e. as 13.1 Kg/hour). The spinneret orifice was oblong of dimensions 0.11×0.38 inches (about 2.8×9.7 mm) indicated as a type "(1)" orifice in Table 1. The monofilament passed vertically downward through an air gap 12 of 34 inches (about 85 cm) into water 13 at 85° C., and passed through such water for a distance of 175 inches (445 cm). After emerging from water bath 13, excess residual quench water was stripped by an air jet 14. The wet monofilament was forwarded by puller rolls 15 driven at 99.5 ypm (91 m/min.) 23 feet (7.1 m) down to feed rolls 16 driven at 100 ypm (91 m/min.). After the feed rolls, water was added to the monofilament (by contact with felt wicks) at a rate of about 0.8 gallon per hour and the monofilament was forwarded past a change of direction roll into a 24 inch (about 60 cm.) long steamer 18, supplied with entrance and exit steam expansion chambers, connected to a vacuum source to prevent steam from leaking into the plant environment. The monofilament was treated with saturated steam at 150 psig. The draw point was located within steamer 18. While still in the steamer, near the exit, the monofilament passed through a bath about 3 cm long containing water at a temperature of about 60° C. flowing at a rate of eight gallons per hour to cool the surface of the monofilament in order to avoid damage by the exit seal of the steamer. The monofilament was then forwarded to an air stripper 19 to remove most of the surface water from the filament. The monofilament was then forwarded to the first stage draw rolls 21 which were in an insulated draw box heated to 160° C., and driven at 460 ypm (421 mpm).

The monofilament was then forwarded to four passes through a radiant heater 22 of length about 50 inches (about 130 cm), and at a mean temperature of about 800° C. The amount of draw was controlled in each pass by controlling the speed of the driven change-of-direction rolls 23 between each pass through the heater. The speeds of the monofilament were as follows: after the first pass through the heater at roll 23A - 540 ypm (494 mpm); after the second pass at roll 23B - 560 ypm (512 mpm); after the third pass at roll 23C - 580 ypm (530 mpm); and after the fourth pass - 590 ypm (540 mpm). The tensions were estimated to be from about 4 Kg at the first pass to about 3 Kg at the fourth pass.

The monofilament passed from heater 22 over a change of direction roll to annealing rolls 24 which were in another insulated box, maintained at 180° C. From these rolls, 24, the monofilament passed directly to the wind up 25 at a tension of about 150 g, while relaxing about 13% to reduce the shrinkage.

Process details and product properties are summarized in Table 1 for this Example 1 and for the other Examples 2–4 and for the Comparisons. It will be noted that the product of Example 1 had zero shrinkage (at 177° C.) in combination with superior knot tenacity and other good tensile properties. (The higher elongation shows that the tensile properties could be optimized by adjusting the drawing conditions to increase the tenacity and modulus without lowering the elongation below what is satisfactory, e.g. in Examples 2–4).

EXAMPLE 2

This Example concerns preparation of a monofilament of higher viscosity (44 LRV) and illustrates the improved tensile properties, especially the increase in knot tenacity that is achieved by raising LRV from 38 to 44. The process was run at a higher speed, but the other details were much the same as for Example I, except (essentially because of the higher melt viscosity) as given in Table 1. The orifice dimensions were 0.09×0.42 inches (about 2.3×10.7 mm). This is referred to in Table 1 as a type "2"orifice. This orifice was used to make the other monofilaments described hereinafter. The speed of the feed rolls was raised to 150 ypm (about 136 m/min) and the temperature of water bath 13 was lowered, and the temperatures later in the process were adjusted. The monofilament properties are also summarized in Table 1. As may be recognized from these data, when low shrinkage is very important, it may be preferred to use polymer of viscosity (LRV) more like that in Example 1, or take additional steps to lower shrinkage of such higher LRV monofilaments.

EXAMPLE 3

In this Example the monofilament was of similar viscosity (38 LRV) to that in Example 1, but of low carboxyl content, obtained by solid phase polymerization of standard 2G-T flake. Such polymer chips (of intrinsic viscosity 1.06) were melted in a 2 inch (about 5 cm) Sterling screw melter and fed to the spinning position. The other process details were much as in Examples 1 and 2 except as summarized in Table 1. The orifice dimensions were as in Example 2, the air gap 12 was shortened to 27 inches (69 cm), the distance through the water bath 13 was shortened to 85 inches (216 cm) with a water temperature of 65° C., and the speed of the feed roll 16 was as in Example 2. This product had an extremely low shrinkage, combined with other desirable properties.

EXAMPLE 4

This Example also used polymer of low carboxyl content (less than 15). The process details were somewhat like those in Example 3, but a lower speed was used, and an even shorter air gap of 15 inches (38 cm), no water was added after feed rolls 16, and, importantly, a 24 inch (about 60 cm) long radiant heater was used as a preheater 17 before steamer 18. The various conditions and properties are summarized in Table 1. It will be noted that the draw ratio was higher, and the tenacity correspondingly raised, but the shrinkage was also higher, and a lower shrinkage would be preferred.

The next three items are labeled Comparisons A, B and C (as the monofilaments of denier about 3,000 were not made according to the invention) and are provided to demonstrate in a comparative way, the advantages of the process of the invention. No steamer 18 was used in any of these tests. The process and product details are summarized in Table 1.

COMPARISON A

In most respects the process was similar to Example 1, except that a 24 inch (about 60 cm) long radiant heater at a temperature of 870° C. was used (instead of steamer 18) between feed rolls 16 and first stage draw rolls 21. This enabled a similar 4.7× draw ratio to be obtained, but the monofilament had tensile properties, especially knot tenacity, inferior to Examples 1–4, combined with a shrinkage of 2.5%.

COMPARISON B

In this comparison, essentially the second stage draw of Example 1 was used without any heating in the first stage before draw rolls 21 (at 140° C.). This meant that little draw (only 1.03×) could be effected in what was the first stage of Example 1, but the first pass in the second stage (2-1 in Table 1) was 5.05×. The annealing rolls were maintained at 160° C. Although a higher tenacity (5.9 gpd) was obtained than in Comparison A (5.1 gpd), the knot tenacity (2.4 gpd) was again low, in comparison with Examples 1–4, combined with a shrinkage of 3.3 %, even higher than for Comparison A.

COMPARISON C

A steam jet was used instead of steamer 18 to effect the first stage draw. This jet used superheated steam at 65 psig and 375° C. The other process conditions were as listed in Table 1. Only 2 passes were used in the radiant heater of the second stage, with the change of direction roll (23A) being an idler roll (instead of being driven). It will be noted that the tensile properties are mostly poorer and the shrinkage much higher than for the other Comparisons. In addition, the impingement of the steam caused severe damage to the monofilament (believed to be caused because the side of the monofil remote from the jet kept hitting against the side of the apparatus).

Samples of all the monofilaments were processed, as were multifilament polyester tire yarns, for comparison, through hot stretching and dipping to produce "dipped cords" ready for use in the production of tires, and their properties are compared in Table 2.

The multifilament polyester tire yarns utilized for comparison were HMLS 1000 denier T-240 tire yarns twisted in both a normal and a special (low twist) construction. The "normal" (sometimes referred to as Standard) cord is twisted to a 1,000/1/2 cord construction with 11 turns per inch twist imparted in both plying and cabling steps. The special low twist cord is twisted to a 1,000/1/2 cord construction with 7.7 turns per inch twist imparted in both plying and cabling steps; as can be seen in Table 2, this increases the modulus to over 100 gpd, but has several disadvantages, including reducing flex life to an undesirable value. Both cords were dipped and hot stretched in a two oven process using a conventional 2-step polyester adhesive dip. Specific conditions employed were 470/425° F., 50/80 seconds exposure time, 3/0% AS (applied stretch), D 417B/D-5A adhesive (i.e. 1st step: D-417B adhesive-470° F./3% applied stretch/50 seconds followed by 2nd step: D-5A adhesive-425° F./0% (no) applied stretch/80 seconds).

The D-417B isocyanate subcoat used for the Control multifilament polyester tire cords was composed of: water (83.7 parts by weight); Gum Tragacnth, 2% solution (2.0 parts by weight); NERO 01A Epoxy resin (1.4 parts by weight); and LVBI Isocyanate slurry, 25% dispersion (12.9 parts by weight). D-5A is a resorcinol-formaldehyde latex-based topcoat adhesive (RFL) to promote adhesion of cord to rubber when preparing polyester tire cords.

The monofilaments of this invention did not require twisting. Surprisingly, attempts to use the conventional, aqueous D-417B subcoat, followed by RFL, produced dipped and stretched cords which adhered only poorly to rubber. It was found that an isocyanate/epoxy subcoat consisting of PAPI (polyaromatic polyisocyanate) and epoxy resin (NERO OlA; Nagase Co.) applied from an non-aqueous solvent, followed by RFL gave excellent adhesion to rubber. Specific process conditions to dip-stretch the monofilament cord were: 212° F./450° F./425° F.//0%AS/8%AS/-4%AS//120 sec/60 sec/60 sec using PAPI-epoxy subcoat (11% PAPI; 1% NERO 01A epoxy; 88% toluene) and D5-A RFL topcoat. The total adhesive, subcoat plus topcoat, is in the range of 0.5–10% for good adhesion. The preferred range of adhesive is 3–5%.

Figure 2:
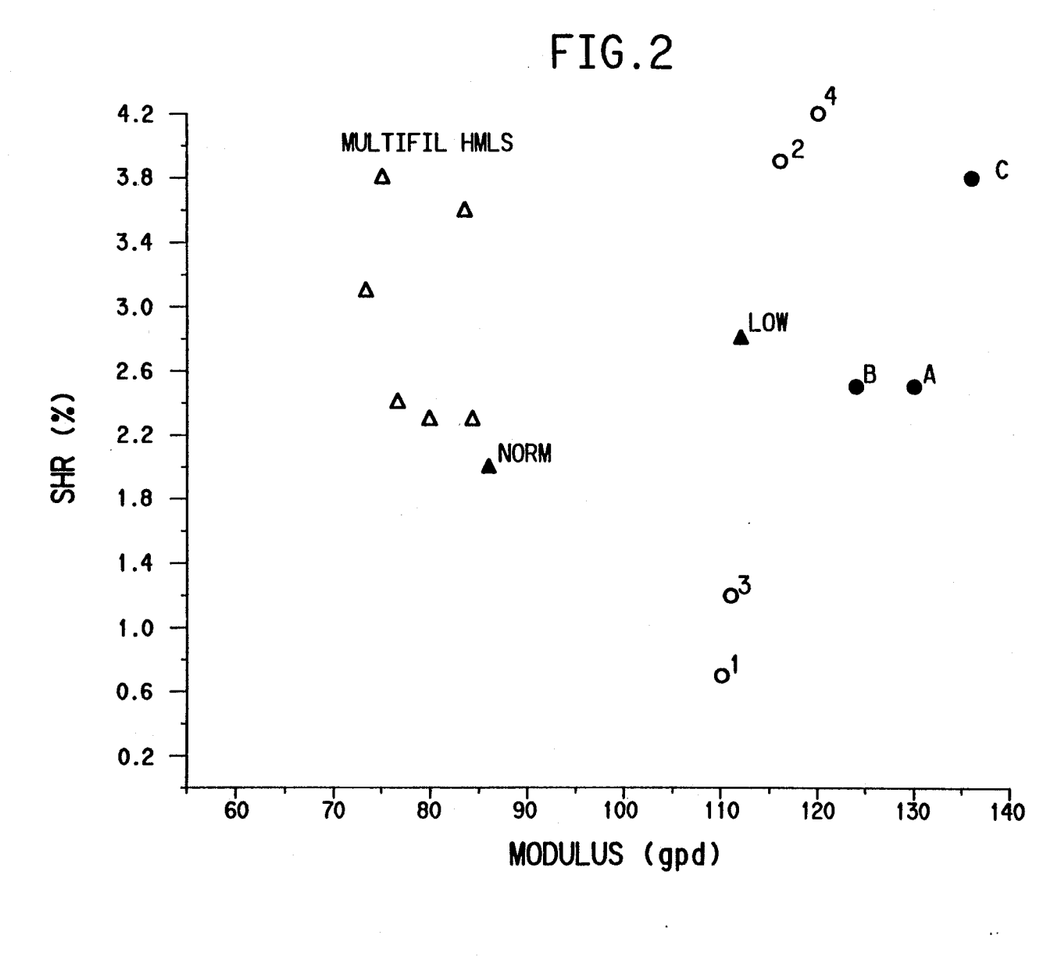
FIG. 2 is a graph plotting shrinkage against modulus to demonstrate how the dimensional stability of dipped cords according to the invention compare with other dipped cords, as described hereinafter.

As indicated, the properties of the dipped cords are summarized in Table 2, which shows some advantages of the invention. The superior modulus values of these monofilament cords over multifilament dipped cords can be demonstrated graphically, as in FIG. 2, which plots shrinkage against modulus for dipped cords. Monofilament cords are shown as circles, whereas multifilament cords are shown as triangles. The T-240 multifilament cords are shown as black triangles, and their properties are also listed in Table 2. Additional commercial HMLS multifilament tire yarns were obtained and processed to dipped cords using the same stretching and dipping conditions as those described for T-240. It will be noted that (except for "LOW" T-240) the "NORM" T-240 (i.e. normal twist) has the highest modulus and the lowest shrinkage among the multifilament cords, but this modulus value is still less than 100 gpd (and the shrinkage is 2%). By reducing the twist, the "LOW" T-240 cord can be provided with a modulus of more than 100 gpd, but other properties suffer, as can be seen from Table 2.

In contrast, the monofilament cords of the invention 1-4 all have modulus values of over 100 gpd accompanied by other good tensile properties, especially knot tenacity, adhesion values over 50 lbs (and ranging up to 75 lbs) and flex values of 95 to 100%, as shown in Table 2. Also, the ability to get low shrinkages below anything else in FIG. 2 has been demonstrated in Examples 1 and 3, in combination with these high modulus values and other advantageous properties. This combination of a modulus of over 100 gpd and a shrinkage of less than 2.5%, distinguishes from all known polyester dipped cords, and such combination is highly desirable. Comparisons A, B and C are shown as black circles, and have worse (higher) shrinkages than Examples 1 and 3. In addition, for Comparisons A–C, although some properties individually may seem satisfactory, these cords do not have a combination that is so desirable. For instance, the elongations of A and C are much too low, and, while B's elongation is better, B's adhesion was poor. The flex value for C (the only one measured) was extremely poor.

Above all, Table 2 shows that the knot tenacities of each of Examples 1–4 is significantly better than any of the Comparisons A–C and than either T-240 cord.

The tires whose properties are given in Table 3 were assembled in two stages on a radial tire manufacturing machine made by NRM, Inc., Model RF 1216, and were molded and cured in a Bag-O-Matic curing press manufactured by Akron Standard Co. A series of radial passenger tires were built, for comparative purposes, from the commercial T-240 tire yarn, utilizing a single ply of fabric for the carcass reinforcement and two plies of 2+2×0.25 steel cord for belts. The carcass fabric was formed from a single end of cord using a drum winding process. Two plies of 20 mil skim rubber (80% natural rubber/20% styrene butadiene rubber) were used in preparing the carcass fabric. Belt plies were formed from steel cord in a similar drum winding process. P155/80R13 tires were then built from this fabric using NRM Corp. tire building equipment. Other components used in constructing the tire were tread and sidewall sections extruded from styrene-butadiene/natural rubber blends, a 50 mil thick sheet of chlorobutyl/natural rubber inner liner, and a pair of rubber wrapped 4-wire/4-turn beads. For the cords of the invention (Example 1), the radial tire construction was identical to the above T-240 controls except that a monoply layer of dipped cords (of this Example 1) was used for the carcass reinforcement. The number of ends of monofil in the fabric was adjusted to provide the same carcass strength as in the multifill polyester control fabrics. The advantages of using the monofilament of the invention can be seen from the results of a series of evaluation tests, given in Table 3.

The Scott flex data were measured (at 100° C. and 150 lbs) on the cords embedded in rubber of thickness 30 mil (about 0.75 mm) and are given in Table 2. The Scott flex data indicate that the flex resistance (or fatigue resistance) of our monofils were superior to the low twist cord.

The remaining tests were measured on the actual P155/80R13 tires and are given in Table 3. This Table 3 shows the following. The Bead Area Endurance Test shows far superior mileage durability for the monofilament, and the monofilament also showed better mileage durability in the DOT 109 Endurance and Extension Test, and achieved a higher load before failure. The Sidewall Plunger Energy of the monofilament was significantly better (33–40%), and the Cornering Coefficient Data indicate that the monofilament has potential for better handling than the T-240 cords. All this adds up to better tires in several respects over existing commercial multifilament cords.

TABLE 1

| | COMPARISONS | | | INVENTION | | | |
|---|---|---|---|---|---|---|---|
| Item # | A | B | C | 1 | 2 | 3 | 4 |
| PROCESS | | | | | | | |
| Thruput - KG/h | 9.0 | 9.0 | 9.5 | 13.1 | 18.5 | 18.5 | 10.4 |
| Orifice | (2) | (2) | (2) | (1) | (2) | (2) | (2) |
| Airgap - cm | 85 | 85 | 69 | 85 | 85 | 69 | 38 |
| Water - cm | 445 | 445 | 445 | 445 | 445 | 216 | 216 |
| Water - °C. | 70 | 85 | 75 | 85 | 35 | 65 | 65 |
| Roll 16 ypm | 100 | 100 | 100 | 100 | 150 | 150 | 75 |
| Heater 17 - °C. | 870 | — | — | — | — | — | 600 |
| Steamer 18 psig | No | No | Jet | 150 | 150 | 150 | 150 |
| Draw Ratios | | | | | | | |
| 1 (Steam) | 4.7 | 1.03 | 4.8 | 4.6 | 4.6 | 4.6 | 4.8 |
| 2-1 | 1.06 | 5.05 | — | 1.17 | 1.17 | 1.15 | 1.17 |
| 2-2 | 1.06 | 1.02 | — | 1.04 | 1.06 | 1.06 | 1.05 |
| 2-3 | 1.06 | 1.02 | — | 1.04 | 1.06 | 1.07 | 1.05 |
| 2-4 | 1.00 | 1.00 | — | 1.02 | 1.00 | 1.00 | 1.00 |
| TOTAL | 5.6 | 5.4 | 5.6 | 5.9 | 6.0 | 6.0 | 6.2 |
| Temps (°C.) of Rolls 21 and 24 and of Heater (Oven) 22 | | | | | | | |
| 21 (Draw) | 160 | 140 | 160 | 160 | 210 | 210 | 180 |
| 22 (Oven) | 800 | 870 | 870 | 800 | 870 | 835 | 750 |
| 24 (Anneal) | 160 | 160 | 120 | 180 | 140 | 140 | 140 |
| MONOFILAMENTS | | | | | | | |
| Denier | 2888 | 2763 | 3048 | 4188 | 3761 | 4085 | 3979 |
| W/T | 3.9 | 3.9 | 4.1 | 3.0 | 3.8 | 3.9 | 4.1 |
| LRV | 36 | 39 | 37 | 38 | 44 | 38 | 38 |
| Tenacity - gpd | 5.1 | 5.9 | 5.2 | 5.7 | 6.6 | 6.6 | 7.4 |
| Elongation % | 15 | 19 | 11 | 27 | 23 | 24 | 20 |
| Modulus - gpd | 96 | 107 | 99 | 84 | 94 | 92 | 100 |
| Knot Ten - gpd | 2.4 | 2.4 | 1.9 | 4.2 | 4.8 | 4.0 | 4.2 |
| DHS (177°) % | 2.5 | 3.3 | 7.5 | 0 | 2.7 | 1.0 | 3.1 |

TABLE 2

Dipped Cord Property Table

| | COMPARISONS | | | INVENTION | | | | T-240 | |
|---|---|---|---|---|---|---|---|---|---|
| Example No. | A | B | C | 1 | 2 | 3 | 4 | Norm | Low |
| Denier (1) | 2787 | 2693 | 2943 | 4028 | 3472 | 3774 | 3819 | 3243 | 3071 |
| Tenacity (gpd) | 5.4 | 5.9 | 5.9 | 6.0 | 7.6 | 7.0 | 7.8 | 6.7 | 7.5 |
| Elongation (%) | 9 | 13 | 9 | 20 | 15 | 16 | 14 | 12 | 10 |
| Adhesion (Lbs) | 56 | 41 | 60 | 64 | 69 | 75 | 51 | 53 | 34 |
| Knot Tenacity (gpd) | 1.9 | 2.1 | 1.8 | 3.6 | 4.3 | 3.8 | 4.1 | 2.8 | 3.3 |
| Scott Flex Data (%) | (2) | (2) | 42 | 95 | 100 | 100 | 100 | 96 | 79 |
| Dimensional Stability | | | | | | | | | |
| Modulus (gpd) | 130 | 124 | 136 | 110 | 116 | 111 | 120 | 86 | 112 |
| Shrinkage @ 177° C. (%) | 2.5 | 2.5 | 3.8 | 0.7 | 3.9 | 1.2 | 4.2 | 2.0 | 2.8 |

Notes
(1) Dip-free deniers.
(2) Not Measured

TABLE 3

Tire Test Results

BEAD AREA ENDURANCE TEST

| | Total Miles (Str. Ret.) |
|---|---|
| Example I | 4830 (94%) |
| Standard T-240 | 3280 (97%) |
| Low Twist T-240 | 2430 (95%) |

DOT 109 ENDURANCE + EXTENSION TEST

| | Load | Total Miles (Str. Ret.) |
|---|---|---|
| Example I | 180 | 4708 (80%) |
| Standard T-240 | 150 | 3700 (82%) |
| Low Twist T-240 | 170 | 4317 (84%) |

SIDEWALL PLUNGER ENERGY DATA

| | Plunger Energy (in-lb) |
|---|---|
| Example I | 456 |
| Standard T-240 | 343 |
| Low Twist T-240 | 325 |

CORNERING COEFFICIENT DATA

| | |
|---|---|
| Example I | 0.167 |
| Standard T-240 | 0.156 |
| Low Twist T-240 | 0.154 |

TABLE 3-continued

Tire Test Results

INFLATION GROWTH DATA (%)

| | |
|---|---|
| Example I | 0.4 |
| Standard T-240 | 0.4 |
| Low Twist T-240 | 0.4 |

We claim:

1. An improved continuous process for melt-spinning and drawing to prepare a monofilament of denier about 1000 to 10,000 from ethylene terephthalate polymer of high intrinsic viscosity in a range of about 0.7 to 1.2, comprising the steps of melt-spinning the polymer through an air gap into a water bath, drawing the resulting monofilament in at least 2 stages, wherein a first stage of drawing is carried out in a zone of steam at superatmospheric pressure between feed rolls and first stage draw rolls, and a further stage of drawing is carried out an elevated temperature, and winding up the drawn monofilament, wherein the improvement is characterized by drawing the monofilament in said first stage in said steam at a draw ratio of at least about 4.5×, said first stage draw rolls being heated to a temperature of at least about 140° C.

2. A process according to claim 1, wherein said draw rolls are heated to a temperature of at least about 180° C.

3. An improved continuous process for melt-spinning and drawing to prepare a monofilament of denier about 1000 to 10,000 from ethylene terephthalate polymer of high intrinsic viscosity in a range of about 0.7 to 1.2, comprising the steps of melt-spinning the polymer through an air gap into a water bath, drawing the resulting monofilament in at least 2 stages, wherein a first stage of drawing is carried out in a zone of steam at superatmospheric pressure between feed rolls and first stage draw rolls, and a further stage of drawing is carried out an elevated temperature, and winding up the drawn monofilament, wherein the improvement is characterized by performing said further stage of drawing in more than one step, and wherein said drawing is performed so the draw ratio between said feed rolls and the end of the first of such steps is at least about 5.3×.

4. An improved continuous process for melt-spinning and drawing to prepare a monofilament of denier about 1000 to 10,000 from ethylene terephthalate polymer of high intrinsic viscosity in a range of about 0.7 to 1.2, comprising the steps of melt-spinning the polymer through an air gap into a water bath, drawing the resulting monofilament in at least 2 stages, wherein a first stage of drawing is carried out in a zone of steam at superatmospheric pressure, and a further stage of drawing is carried out an elevated temperature in a non-contact heater, and winding up the drawn monofilament, wherein the improvement is characterized by performing said further stage of drawing in three or more steps, and wherein less than 10% of said further drawing in said non-contact heater is performed in the last of such steps.

5. An improved continuous process for melt-spinning and drawing to prepare a monofilament of denier about 1000 to 10,000 from ethylene terephthalate polymer of high intrinsic viscosity in a range of about 0.7 to 1.2, comprising the steps of melt-spinning the polymer through an air gap into a water bath, drawing the resulting monofilament in at least 2 stages, wherein a first stage is carried out in a zone of steam at superatmospheric pressure, and a further stage of drawing is carried out an elevated temperature, and winding up the drawn monofilament, wherein the improvement is characterized in that, before winding up, the drawn monofilament is annealed on annealing rolls heated to a temperature of about 100° to 250 ° C.

6. A process according to claim 5, wherein said annealing rolls are heated to a temperature of at least about 140° C.

7. A process according to claim 5, wherein said annealing rolls are heated to a temperature up to about 200° C.

8. An improved continuous process for melt-spinning and drawing to prepare a monofilament of denier about 1000 to 10,000 from ethylene terephthalate polymer of high intrinsic viscosity in a range of about 0.7 to 1.2, comprising the steps of melt-spinning the polymer through an air gap into a water bath, drawing the resulting monofilament in at least 2 stages, wherein a first stage is carried out in a zone of steam at superatmospheric pressure, and a further stage of drawing is carried out an elevated temperature, and winding up the drawn monofilament, wherein the improvement is characterized by winding up the monofilament at a winding tension in the range of about 100–200 grams.

9. A process according to claim 8, wherein, before winding up, the drawn monofilament is annealed on annealing rolls at a temperature of about 100° to 250° C.

10. A process according to any one of claims 1 to 9, wherein the water bath is at a temperature in a range of about 35°–90° C.

11. A process according to any one of claims 1 to 9, wherein a heater is provided to adjust the temperature of the monofilament before entering the steam zone in said first stage.

12. A process according to any one of claims 1 to 9, wherein the monofilament is heated by a non-contact heater in said further stage of drawing.

13. A process according to claim 12, wherein said non-contact heater is a radiant heater.

14. A process according to claim 13, wherein said heater in said further stage of drawing is at a temperature of at least about 600° C.

15. A process according to any one of claims 1 to 9, wherein the monofilament is strung up with minimal twist less than 1 turn per foot through the drawing stages.

* * * * *

UNITED STATES PATENT AND TRADEMARK OFFICE
CERTIFICATE OF CORRECTION

PATENT NO. : 5,223,187
DATED : June 29, 1993
INVENTOR(S) : William A. Chantry, et. al.

It is certified that error appears in the above-indentified patent and that said Letters Patent is hereby corrected as shown below:

On the Title page, item [75] Inventor: delete "Taracad K. Venkatachalam, Wilmington, Del.

Signed and Sealed this

First Day of February, 1994

*Attest:*

BRUCE LEHMAN

*Attesting Officer*     *Commissioner of Patents and Trademarks*